(12) United States Patent
Tompkin et al.

(10) Patent No.: US 6,226,109 B1
(45) Date of Patent: May 1, 2001

(54) DIFFRACTIVE SECURITY DEVICE ON COMPACT DISCS

(75) Inventors: Wayne R. Tompkin, Baden; René Staub, Cham, both of (CH)

(73) Assignee: OVD Kinegram AG (CH)

( * ) Notice: Subject to any disclaimer, the term of this patent is extended or adjusted under 35 U.S.C. 154(b) by 0 days.

(21) Appl. No.: 09/370,862

(22) Filed: Aug. 9, 1999

Related U.S. Application Data
(60) Provisional application No. 60/096,120, filed on Aug. 10, 1998.

(51) Int. Cl.[7] ....................................................... G03H 1/00
(52) U.S. Cl. ................................. 359/2; 359/19; 365/124; 365/125; 365/215; 365/216; 369/103; 369/109; 369/275.1; 369/280; 369/282
(58) Field of Search ........................ 359/2, 19; 365/124, 365/125, 214, 216, 215; 369/103, 109, 275.1, 280, 282

(56) References Cited

U.S. PATENT DOCUMENTS

| | | | |
|---|---|---|---|
| 4,126,373 | * 11/1978 | Moraw | 350/3.61 |
| 5,136,560 | * 8/1992 | Hangai et al. | 369/32 |
| 5,371,792 | * 12/1994 | Asai et al. | 380/3 |

* cited by examiner

*Primary Examiner*—Cassandra Spyrou
*Assistant Examiner*—Craig Curtis
(74) *Attorney, Agent, or Firm*—Proskauer Rose, LLP

(57) ABSTRACT

This invention relates to marking the genuine CD in an easily detectable way while difficult to counterfeit. The improved CD has within its layers a second structured surface parallel to the flat surfaces of the CD. The second structured surface acts as a diffractive security device, that is to be read out from the same side of the CD, the verso side, as the data structure. In one example, the second structured surface is defined by a step of the refractive index or by a transparent reflective layer. Despite the diffractive rainbow colors observed on the verso side of the CD, the structure of the security device can be read out visually and/or with a CD-reader, even by a simple hand-held reader, and verified without the need of a bulky apparatus. A CD-reader prevents the playing of embodiments of the improved CDs.

26 Claims, 5 Drawing Sheets

DIFFRACTIVE SECURITY DEVICE ON COMPACT DISCS

RELATED APPLICATION

This non-provisional application claims the benefit of U.S. Provisional Application Ser. No. 60/096,120, entitled, "Diffractive Security Devices for Compact Discs," filed on Aug. 10, 1998, to Rene Staub.

FIELD OF THE INVENTION

This invention relates to diffractive security devices to establish the authenticity of compact discs which are used to store music or videos or data for computers. In particular, the compact disc carries a diffractive security device as a marker which allows to distinguish between an authorized copy and a fraudulent one of a compact disc.

BACKGROUND OF THE INVENTION

To prevent product piracy in the compact disc (="CD") business, several proposals are known, predominantly to assure the customer that he is buying an authorized CD in the original package. A hologram label used as a seal prevents the breaking of the compact disc cover. Nowadays not only the CD itself is counterfeited but also the original package and the seal.

The GB-A 2 290 526 proposes to attach a hologram label to the information label on the non-readable side of the CD. The information label carries printed information and may incorporate a hologram to enhance security or for artistic effects. The information label is laminated to the non-readable side of the CD. Part of the printing comprises machine-readable information, such as a bar code. The information label of another execution of the CD is printed directly on the non-readable side of the CD prior to the attaching of the hologram label. Here a counterfeit label may be added to unauthorized copies of the CD.

The U.S. Pat. No. 5,737,298 uses a polarimeter arrangement by which the extend of the birefringence is measured in the bona fide CD in comparison to a genuine CD. Any difference between the two measurements may indicate an illegal copied CD. This effect is based on the minute geometrical differences in the depth of the "pits" with respect to the "land" (plane) of the CD due to the illegal copying process. The minute geometrical differences cause locally phase differences, which in turn has a polarizing effect to the reflected light.

Several manufacturers of CD add, to the master, a mosaic of diffractive gratings or a hologram outside of the data structure area of the CD, e.g. the mosaic a notice of copyright and a logo around the center hole.

In contrast to the bright holograms creating a variable visual impression, the U.S. Pat. No. 4,501,439 teaches the construction of a visually inconspicuous, completely transparent plastic laminate label for bank notes having an optical marks made from diffractive gratings embedded within the laminate. The information stored in the optical marks is only machine-readable while the optical marks are too faint to be visually recognizable. Examples of overlay foil construction incorporating diffractive structures are described in U.S. Pat. No. 5,104,471. Other only machine-readable diffractive gratings on telephone cards are known from the U.S. Pat. No. 4,119,361. The diffractive gratings are covered by black plastic layers which are transparent for infrared light but not for light in the visual range of the radiation spectrum.

An information carrier according to U.S. Pat. No. 5,886, 798 (formerly Ser. No. 08/664,453) has optical marks which are only recognizable on a screen if illuminated with coherent light. The fine structured optical marks do not reveal their information in non-coherent light.

The U.S. Pat. No. 6,060,143 by the same inventors teaches Double-Layer Security Devices which are a combination of two aligned diffractive features and the use of the parallaxes.

Machine readable holograms on CD for reasons other than for security reasons are reported by the GB-A 2 152 695 and the U.S. Pat. No. 5,754,520. Here, music or other digital information are stored much more densely on the CD by spot-like holograms along a track rather than by the "pits and land" formation of an usual CD as pointed out in Encyclopedia of Polymer Science and Engineering, vol.11, pages 657, 675–677, John Wiley & Sons, ISBN 0-471-80943-8. Machine-readable patterns of juxtaposed fields of diffractive gratings are known from the application EP 0 718 795 A1.

The U.S. Pat. No. 4,856,857 serves as a compilation of materials which can be used for laminates with embedded transparent or reflective holograms.

The GB-B 2 082 593 teaches methods to modify the refractive index of polymer resins used in machine-readable diffractive security labels.

SUMMARY OF THE INVENTION

With the available technologies, it is relatively easy to copy a standard compact disc or CD. This invention relates not to preventing the copying of the CD but to marking the genuine CD in an easily detectable way while difficult to counterfeit. The improved CD has within its layers a second structured surface parallel to the flat surfaces of the CD. The second structured surface acts as a diffractive security device that is to be read out from the same side of the CD, the verso side, as the data structure. In one example, the second structured surface is defined by a step of the refractive index or by a transparent reflective layer. Despite the diffractive rainbow colors observed on the verso side of the CD, the structure of the security device can be read out visually and/or with an optical reading device, even by a simple hand-held reader, and verified without the need of a bulky apparatus.

BRIEF DESCRIPTION OF THE DRAWINGS

For a better understanding of the detailed description reference is made to the drawings which are not shown to scale.

DETAILED DESCRIPTION OF THE PREFERRED EMBODIMENTS

Figure 1:
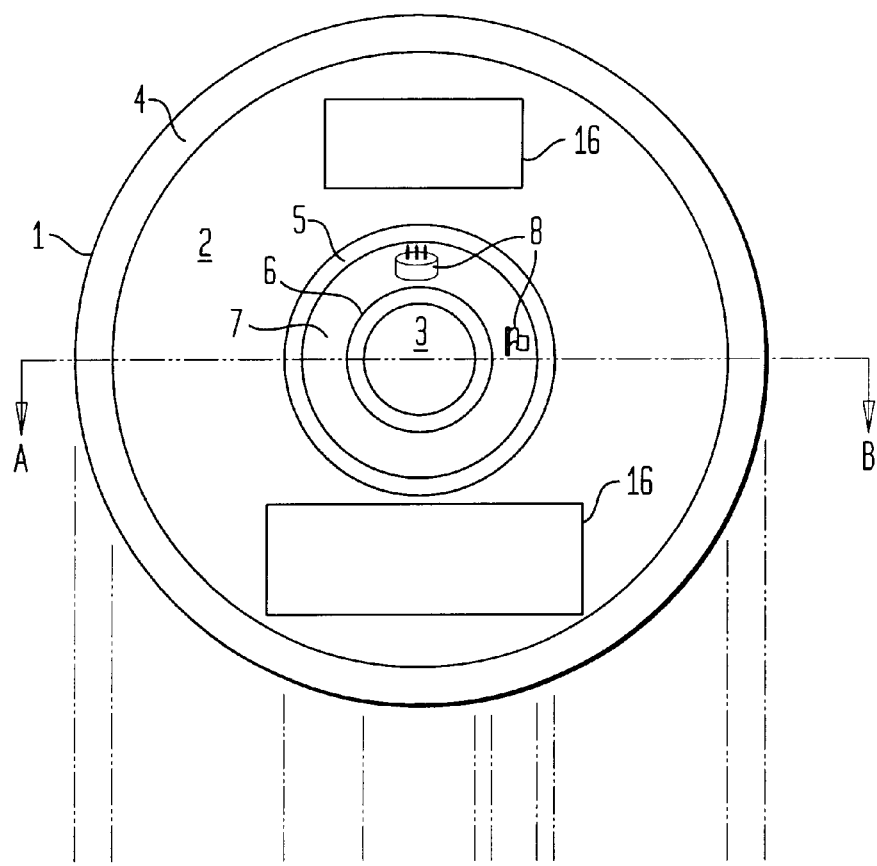
FIG. 1 shows a compact disc of prior art.

FIG. 1 shows the recto side of a compact disc (or for short CD). The reference numbers denote 1 a CD, 2 information area of the CD 1, 3 a center hole in the disc, 4 an outer annulus, 5 and 6 spacing rings, 7 an identification annulus and 8 information (logos, batch numbers, letters etc.). The compact discs 1 are manufactured by injection molding using an injection die (not shown here). The injection die is composed of two molds enclosing the space of the CD 1. Their inner surfaces defining the concentric surfaces of the CD 1 are circular and parallel plane surfaces spaced about 1.2 mm apart. The top circular surface of the die is the master with the negative data structures for the information area 2 and for the identification annulus 7 arranged between the spacing rings 5, 6. The circular top surface of the die in the region of the outer annulus 4 and of the spacing rings, 6, and the opposite surface of the die are mirrored surfaces. The molten plastic, usually a polycarbonate, is injected in between the molds to become, after cooling, the body of the CD 1.

Whereas the embodiments described below are shown as examples of the widely known optical CD 1 "Read-Only-Memory" type of 120 mm diameter, the invention is easily extended to optical discs having a larger or a smaller diameter as well as noncircular forms as well as to differing storage densities and/or means, as is the case for the Digital Video Disk ("DVD"), and to optical discs, where the data in the information area 2 may be written once or repeatedly.

Figure 2:
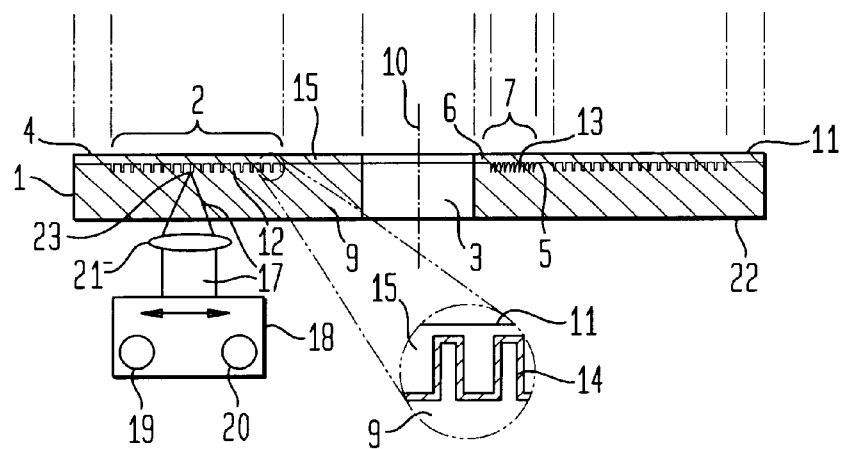
FIG. 2 is a cross section through the compact disc of prior art.

A cut along the line A--B reveals the inner structure of the CD 1 as shown in FIG. 2. The CD 1 has a 1.2 mm thick disc body 9 of a clear plastic with a center hole 3 of 15 mm diameter and is concentric about an axis perpendicular to the plane of the CD 1. The minute spacing ring 5 separates the identification annulus 7 from the information area 2. The larger inner spacing ring 6 is used as a clamping area. A CD reader (not shown here) clamps the CD 1 onto the inner spacing ring 6 to spin the CD 1 around the axis 10. The boundaries between the outer annulus 4, the information area 2, the spacing rings 5, 6, the identification annulus 7, and the center hole 3 are concentric, i.e. their centers coincide on the axis 10. The inner spacing ring 6 extends to a diameter of 33 mm and carries no data. The information area 2 extends from the diameters 50 mm to 116 mm and is used to store digital information of any kind (music, pictures, videos, data etc.). On its top surface 11, the disc body 9 is structured in the information area with microscopic data structures 12, and, if any, diffractive structures 13 of the information 8 (FIG. 1) within the identification annulus 7. The information 8 may also be printed. The top surface 11 is covered at least over the information area with a few 100 mm thick reflective layer 14 shown in the enlarged section of the data structure. The reflective layer 14 is usually a metal such as aluminum, gold, silver, etc. The top surface 11 and the reflective layer 14 are coated with a liquid lacquer to obtain a lacquer layer 15 of about 0.2 mm thickness. The fragile reflective layer 14 is completely enclosed between the disc body 9 and the lacquer layer 15.

The lacquer layer 15 is printed or laminated with an information label 16 (FIG. 1).

The data of the CD 1 is read out through the transparent disc body 9 by a monochromatic light beam 17 emitted by a radially moving reader head 18 comprising at least a laser light source 19 and a photo diode 20 receiving reflected light from the data structure 12. A lens 21 of short focal length, e.g. about 2 mm, focuses the light beam 17 through the disc body 9 onto the reflective layer 14. The light beam 17 has about a diameter of 0.5 mm to 1 mm at the opposite surface 22 of the disc body 9 and is formed to a focal spot 3 of 1 $\mu$m diameter at the reflective layer 14 near the top surface 11. Therefore fine scratches on the opposite surface 22 do not influence the reading of the data in the information area 2.

The CD 1 of prior art may be easily copied and unauthorized copies of the CD 1 sold. Several methods of copying are known, e.g.:

a) The data of the CD 1 are transferred to a mass storage and then the data are written (="burned") onto a writeable CD 1. This copy of the original CD 1 does not pretend to be genuine and is normally not intended for sale;

b) The data of the CD 1 are transferred to a mass storage, then the master for the circular surface of the die is reproduced (=remastering).

c) The lacquer layer 15 of the genuine CD 1 is dissolved and removed from the top surface 11 and the structures 12 and 13 of the top surface 11 are laid bare to be copied by a galvanic process to get a new master.

Once the fraudulently obtained master is available, the copies of the disc body 9 are reproduced by injection molding and finished for sale to look alike to the original CD 1. Especially the copy process and c) reproduces faithfully all the diffractive gratings and hologram structures of a security device added to the top surface 3 outside the information area 2. The CD 1 of prior art needs therefore an integrated authentication device to distinguish the genuine CD 1 from an unauthorized one.

Different embodiments of the improved CD 1 with an additional security device are discussed below:

The improved CD 1 has within its layers a second structured surface parallel to the top and opposite surfaces 11, 22. The second structured surface which also may be the opposite surface itself acts as a diffractive security device, that is to be read out from the same side of the CD 1, the verso side, as the data structure 12. The second structured surface is defined by a step of the refractive index or by a reflective layer within the material of the CD 1.

Figure 3:
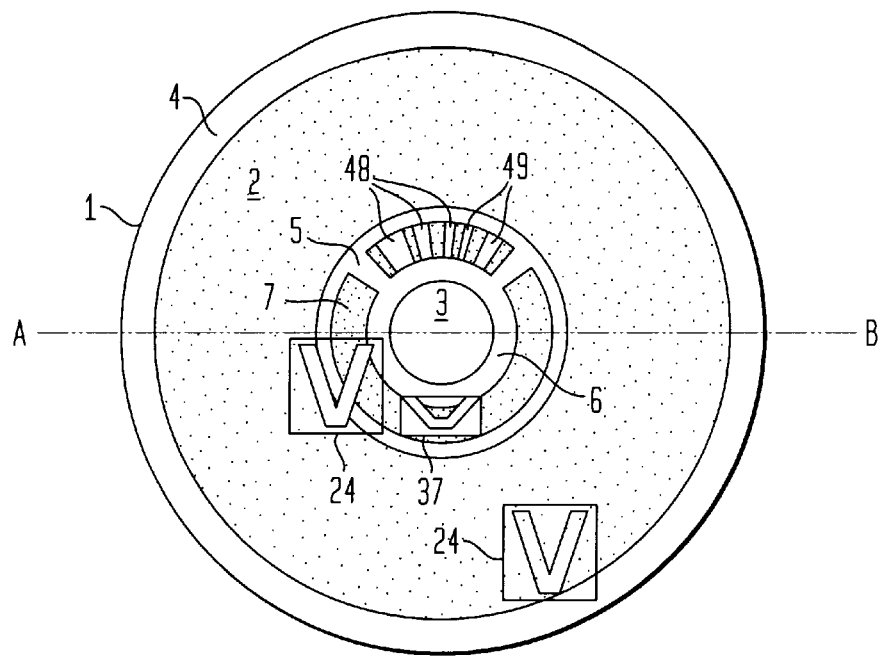
FIG. 3 shows the opposite surface of an improved compact disc.

In FIG. 3 the verso side of the improved CD 1 is shown. Through the transparent disc body 9 (FIG. 2), the reflective layer 14 (FIG. 2) covering the information area 2 and, optionally, the identification annulus 7 are easily recognized (shaded areas in the drawing of FIG. 3). Observing the verso side of the CD 1 in white light, the data structure 12 (FIG. 2) in the information area 2 diffracts light so that the information area 2 in white light appears as a bright annulus showing a multitude of rainbow colors. The information 8 (FIG. 1) of the identification annulus 7 is displayed on this side, too. Since the fine scratches, as mentioned above, do not interfere with the read-out of the data structure 12 in the information area 2, the fine gratings of additional diffractive features 24 will not disturb the reading-out of the stored data. A diffractive security label 37 may be placed instead or together with the features 24 in the area of the inner spacing ring 6 and identification annulus 7. The improved CD 1 uses the opposite surface 22 as an ideal area to add the additional security features 24, 37 based on diffractive gratings. The negative relief structure of the security features 24, 37 may be engraved into the opposite surface of the die and may extend over the whole opposite surface of the die or cover only part of the opposite surface, e.g. in the area of the identification annulus 7, the information area 2, etc. The disc body 9 of the molded CD 1 carries on the opposite surface the diffractive features 24 and/or the security label 37 which have been formed by the die. If the security features 24, 37 cover only part of the opposite surface 22 they can be placed anywhere on the opposite surface 22. Certain areas on the opposite surface are preferred to display the security features 24, 37, e.g. the area of the inner spacing ring 6 and/or the identification annulus 7. By example the diffractive features 24, 37 are in form of a transparent rectangular mark. One mark extends over parts of the information area 2 and the outer annulus 4, whereas the other mark is placed across parts of the identification annulus 2, the spacing rings 5, 6 and the identification annulus 7. The security label 37 is placed in the preferred area 6, 7.

Figure 4:
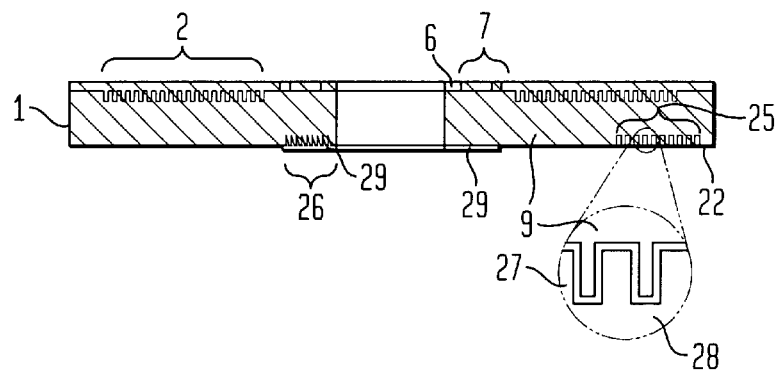
FIG. 4 is a cross section through a first embodiment of the improved compact disc.

As example A, a basic embodiment of the improved CD 1 is shown in a cut along the line A-B in FIG. 4. Relief structures 25, 26 of the security features 24 (FIG. 3), 37 (FIG. 3) are molded into the opposite surface of the disc body 9. The relief structures 25, 26 have a plastic/air interface through which the light beam 17 (FIG. 2) impinges upon the CD 1 while reading-out the data from the information area 2. The relief structures 25, 26 are not protected and allow visual inspection and authentication of unused CDs 1. An alternative execution of the example A has an improved visibility of the security feature 24, 37 by coating the disc body 9 on the opposite surface with the relief structures 25, 26 with a transparent dielectric reflector 27 at the interface of the plastic material of the disc body 9 and air 28 as shown in the enlarged section of FIG. 4. The identification annulus 7 and/or the inner ring 6 are a preferred area 6, 7 for those diffractive features 24 which are intended for visual inspection. In the preferred area 6, 7, where the optical conditions are not so stringent, another embodiment of the security label 37 uses a metallic reflector 27 instead of a dielectric one to enhance the visibility even more. A clear plastic fill layer 29 can optionally be applied as a lacquer to protect the relief structures 25, 26. The lacquering may be realized using ink jet techniques.

Figure 5:
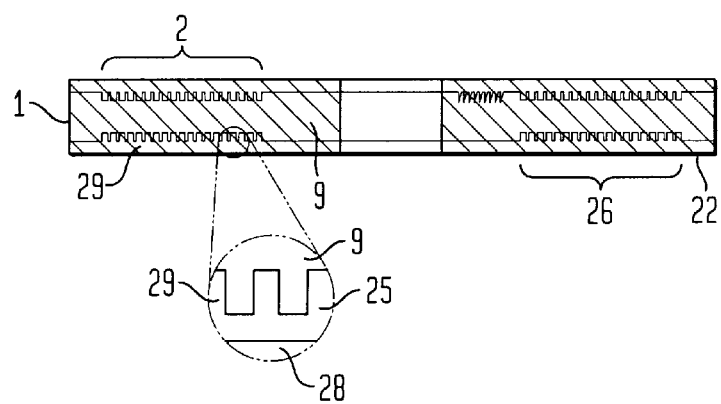
FIG. 5 is a cross section through a second embodiment of the improved compact disc.

The improved CD 1 with the incorporated machine-readable diffractive feature 4 which cannot be recognized visually is executed by various methods:

As example B, a second embodiment of the CD 1 is shown in FIG. 5. The disc body 9 is injection molded using a first plastic material. In addition to the CD 1 of prior art, the relief structures 25, 26 of the diffractive feature 24 (FIG. 3) is formed into the opposite surface 22. As an example, the relief structure 26 covers the opposite surface 22 in an area which is opposite to the information area 2. After the injection molding, the relief structures 25, 26 are then advantageously completely filled in with the liquid lacquer when the whole opposite surface 22 gets completely covered, e.g. by a printing process, to obtain the clear transparent plastic fill layer 29 which protects the relief structures 25, 26. The plastic fill layer 29 has a smooth surface towards the air 28 as shown in the enlarged section. In the preferred area 6, 7 for the diffractive features 24 where the optical conditions are not so stringent, the lacquering may be realized using ink-jet techniques.

Figure 6:
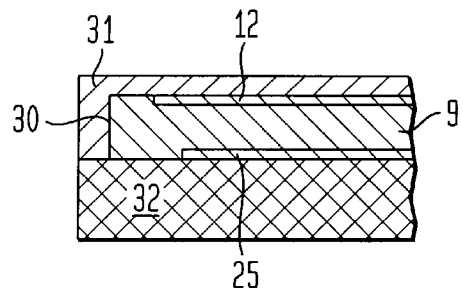
FIG. 6 is a cross section through a die with a data disc.
Figure 7:
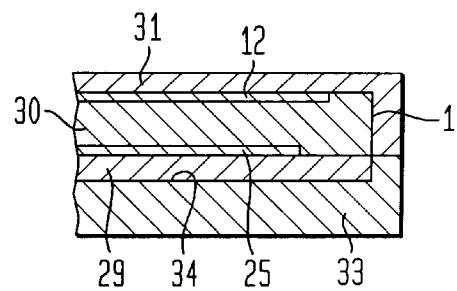
FIG. 7 is a cross section through the die with a second mold and the compact disc.

As example C, a third embodiment of the CD 1 is the result of a two-step molding process. In FIG. 6, the disc body 9 of an injection molded data disc 30 is shown between molds 31, 32 of the die after the first step of this process. The data disc 30 is thinner than the normal CD 1 (FIG. 2) of prior art. The top side of the data disc carries the data structure 12 of the information area 2 (FIG. 2) and optionally the diffractive structure 13 (FIG. 2) of the identification annulus 7 (FIG. 2). The diffractive relief structures 25, 26 (FIG. 5) are on the opposite side of the data disc 30. After the first step, the first mold 32 forming the opposite side of the data disc 30 with the negative of the relief structures 25, 26 is replaced in FIG. 7 by a second mold 33 where its plane 34 directed towards the opposite side of the data disc 30 is mirror-flat. The die is formed by the top mold 31 and the first mold 32. The plastic fill layer 29 is realized by a second injection molding step adding a second plastic material to the opposite side of the data disc to obtain the CD 1 with the standard thickness of 1.2 mm (+0.3 mm, −0.1 mm). The space between the second mold 33 and the data disc 30 is filled with the second plastic material, which forms the plastic fill layer 29. The fine data structure 12 and the relief structures 25, 26 are just indicated in the drawing of FIGS. 6 and 7 by tinted areas, only.

Figure 8:
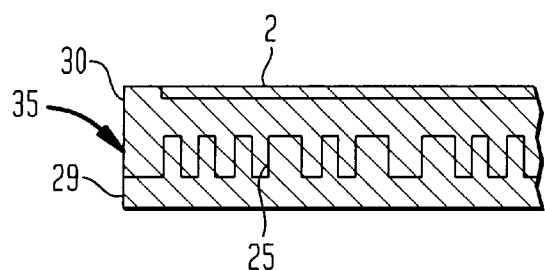
FIG. 8 is a cross section through a third embodiment of the improved compact disc.

The cross section of the resulting CD 1 according to example C is shown in FIG. 8. The data disc 30 and the plastic fill layer 29 become a two-layered structure or laminate 35. The finished laminate 35, with the thickness of 1.2 mm (+0.3 mm, −0.1 mm), conforms to the CD 1 (FIG. 2) of prior art. The laminate 35 encloses, between the data disc 30 and the plastic fill layer 29, the diffractive relief structures 25, 26 (FIG. 5) in one or more planes at a distance from 0.5 to 1.0 mm from the reflective layer 14 (FIG. 2) in the information area 2.

The CD 1 embodiments of the examples A, B, and C receive finally the protective lacquer layer (FIG. 2) and the information labels 16 (FIG. 1) on their recto side.

Referring to the ideas covered in the U.S. Pat. No. 4,501,439, already mentioned, the interface of two transparent materials with different refractive indices has a reflective efficiency depending on the difference $D_n$ of their refractive indices. If a relief of a diffractive structure structures the plane of the interface, the diffraction effects in reflection are visually spotted with ease if the value of the refractive index difference $D_n$ at the interface is above 0.2 albeit the materials are transparent.

The first plastic material of the disc body 9 of example B (FIG. 5) and of example C (FIG. 6) is almost identical to the polymer material of the plastic fill layer 29. This ensures a good mechanical bond between the disc body 9 and the plastic fill layer 29. The materials thereof differ in their respective refractive indices. Since no metallic or dielectric reflective layer 14 (FIG. 2) separates the materials of the disc body 9 and the plastic fill layer 29, the plastic fill layer 29 cannot be dissolved without damaging the relief structures 25, 26 (FIG. 5) at the interface between the disc body 9 and the plastic fill layer 29. Therefore the diffractive feature 24 (FIG. 3) is optimally protected against forgery attempts.

In table I polymer materials which might be used for the plastic fill layer 29 to be combined with the clear polycarbonate material of the disc body 9 are listed with their index of refraction.

If the difference in refractive index $D_n$ between the disc body 9 and the plastic fill layer 29 is below 0.2, then the diffractive efficiency of the diffractive feature 24 is so low that it is visually recognizable only with difficulty, if at all, because of the diffractive effects caused by the data structure 12 (FIG. 2). On the other hand optical reading devices according to U.S. Pat. No. 4,501,439 or U.S. Pat. No. 5,886,798, already mentioned, are able to read out the information represented by the diffractive feature 24.

An optimal chemical and mechanical match of the materials for the disc body 9 and the plastic fill layer 29 is obtained by using the same polymer one of which is modified to change its refractive index. By adding a suitable dye, the refractive index is changed predominantly in a spectral region r where the optical reading device is working. By example, a narrow band-width dye is added to the first or second plastic material, e.g. polycarbonate, or different dyes for both plastic materials for the disc body 9 and for the plastic fill layer 29, respectively, so that the refractive index difference $D_n$ at the interface between the first and second plastic materials is $0.1 < |D_n| < 0.2$ for a spectral region Γ and $|D_n| < 0.1$ elsewhere. The diffractive feature 24 remains machine-readable but is too faint to be visible.

TABLE 1

Index of refraction $n_D$ for different polymer resins

| Polymer Resin | Index of Refraction $n_D$ |
| --- | --- |
| Polyvinylchloride | 1.60–1.63 |
| Bisphenol A Polycarbonate | 1.584 |
| Polyethylene | 1.50–1.54 |
| Methylmetacrilate | 1.49 |
| Vinyl acetate resin | 1.45–1.47 |

If the diffractive feature 24 is in the region of the information area 2, the reflectance and birefringence must remain particularly within the specifications following the possible incorporation of the diffractive features 24. The opposite surface 22 is interesting for the addition of the diffractive features 24 while the laser beam is relatively large at this plane and relatively unaffected by the surface relief of the plastic-air interface. According to the standard ECMA-130, the reflectance of the transparent substrate under normal incidence and parallel beam in an unrecorded part of the information area shall be at least 70% and the relative variation of this reflectance for frequencies below 100 Hz shall be less than 3% for a disk rotating at scanning velocity which may be as low as 200 rpm. More stringent, however, is the requirement of less than 30% loss of the incident beam; this limits the visibility, for example.

Figure 9:
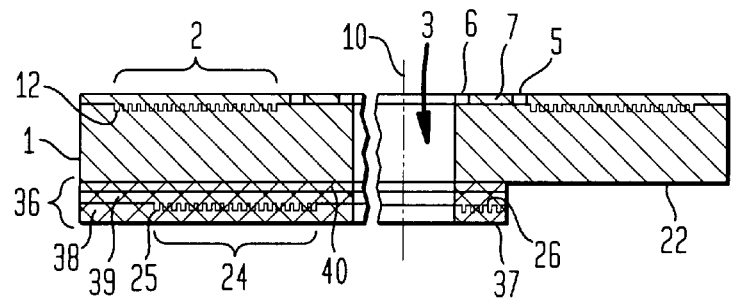
FIG. 9 is a cross section through a fourth embodiment of the improved compact disc.

As example D, a fourth embodiment of the CD 1 is shown in FIG. 9. In order to have a fast time to market and in order to retain the mass manufacturing processes of the CD 1 with minimal changes, it is advantageous to incorporate the machine-readable diffractive feature 24 as security device in the form of a overlay foil 36 or in the form of the security label 37 bonded to the smooth opposite surface 22 of the CD 1 of the prior art. The overlay foil 36 may cover the whole opposite surface albeit the security features 24, 37 are much smaller, e.g. arranged in a plurality of spots. This technique allows a straightforward application in the existing mass manufacturing processes. The overlay foil 36 is comprises at least two thin transparent layers 38, 39 of plastic material laminated together. The basis layer 39 is covered on the outside of the overlay foil 36 with a heat or pressure activated glue layer 40 or the material of the basis layer 39 is the heat—or pressure—activated glue. The relief structures 25, 26 of the security features 24, 37 are enclosed between the front layer 38 and the basis layer 39. Construction examples of the overlay foil 36 are shown in U.S. Pat. No. 4,501,439, U.S. Pat. No. 5,104,471 or U.S. Pat. No. 5,886,798, already mentioned. The overlay foil 36 is manufactured separately, stored on rolls of semitransparent labels complete with the heat or pressure activated glues ready to be bonded to any surface. The overlay foils 36 with different designs of the security features 24, 37 are commercially available products under the trademark Trustseal™ (Trustseal™ is a trademark owned by OVD Kinegram AG). Since CD readers have a rotation speed of the CD 1 as low as 200 rpm, the diffractive features 24 must be designed that the "average" effect on the incident light beam 17 (FIG. 2) remains under 3%. Currently known designs of the diffractive features 24 of the products Trustseal™ are particularly well suited for this purpose since the designs are fairly homogenous on millimeter scales.

In a first execution of the example D, the overlay foil 36 covers at least partially the whole opposite surface 22 especially in the region of the information area 2. The overlay foil 36 must meet the same stringent conditions with respect to the reflection and transparency as the laminate 35 (FIG. 8) of example B. The diffractive feature 4 is hardly seen visually by the unaided eye through the front layer 38, if looked upon the verso side of the CD 1 in daylight. The data structure 12 gives such a strong background signal in rainbow colors that the diffraction effects of the diffractive feature 24 are not recognized.

Owing to the possible variation of the glue, especially the pressure activated one, the optical conditions required for the CD 1 may not be met. It is advisable to apply even the machine-readable structures in the area 6, 7 between the minute spacing ring 5 and the center hole 3, where the optical quality is not so critical. In a second execution of the example D, the overlay foil 36 is applied outside of the information area 2, e.g. in the preferred area 6, 7 for the security label 37. In this area, the security label 37, cut from the overlay foil 36 in form of an annulus, is arranged and bonded to the opposite surface concentric to the axis 10 of the center hole 3. In another version, the small security label 37 of any shape is bonded to the opposite surface 22 in the preferred area 6, 7. Due to the relaxed optical condition in the preferred area 6, 7, even security labels 37 of excellent visibility may be used.

The security features 24, 37 for the above mentioned embodiments of the CD 1 may have the relief structures 25, 26 of a well-known hologram or a mosaic of diffractive gratings. Advantageous are the variants mentioned below:

Variant 1

Figure 14:
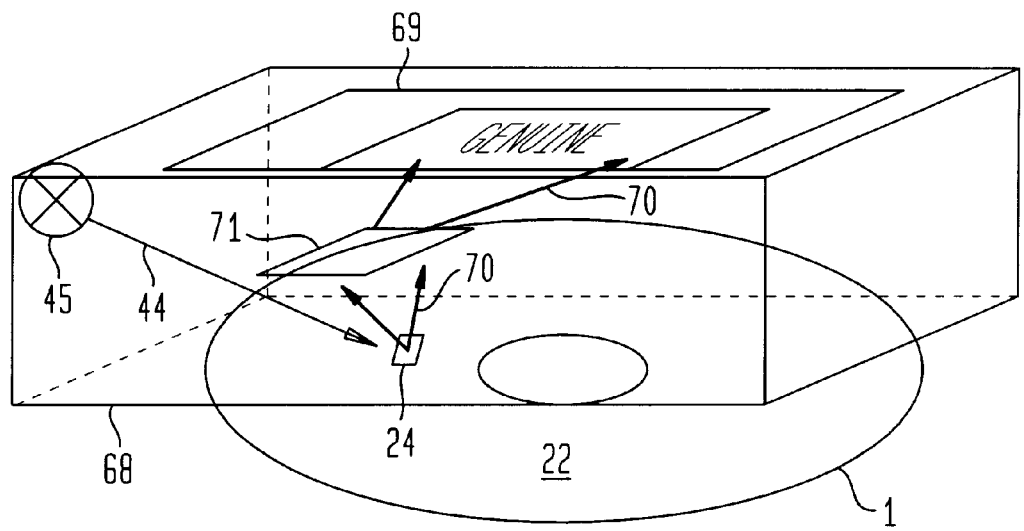
FIG. 14 shows a hand-held reader.
Figure 15:
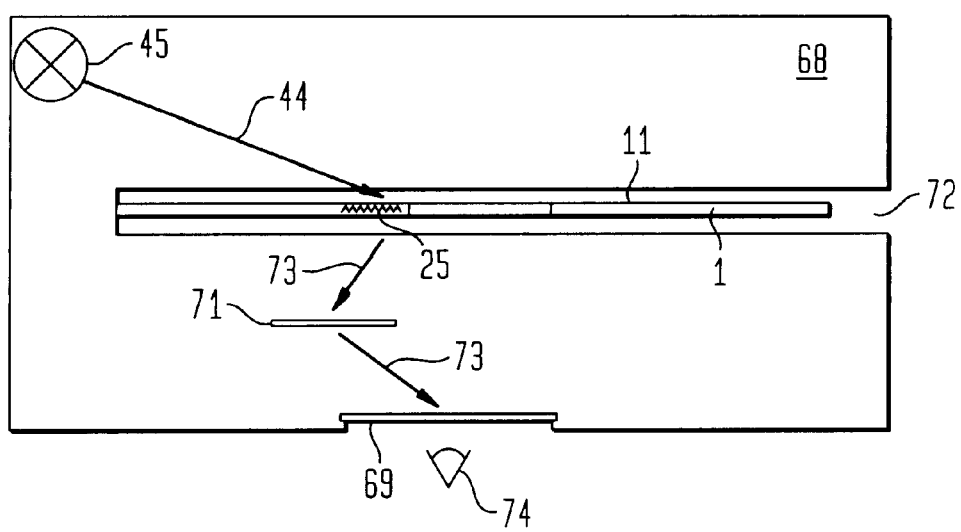
FIG. 15 is a cross-section through the hand-held reader.

The diffractive security device is the diffractive feature 24 with a Hidden Information Feature, either in combination with a visual security device or alone. The Hidden Information Feature is realized as a distorted Fourier hologram with a carrier frequency of more than 3,000 lines per mm and a shallow relief depth of less than 30 nm or as a kinoform according to U.S. Pat. No. 5,886,798, already mentioned. The information of such a security feature 24, 37 is only recognized if illuminated with coherent light by a simple hand held reader which, in case of detecting the distorted Fourier hologram, comprises a special "matched" hologram for removing the distortion of the Fourier hologram. The information is visible on a screen of the reader and is an image of a logo and/or text. The principle of the reader is shown in FIG. 8 of U.S. Pat. No. 5,886,798, already mentioned. Two embodiments of the reader are shown in FIGS. 14 and 15.

This Hidden Information Feature in the information area provides an effective second-line security device. The intention of the Hidden Information Feature is to allow a fast and unambiguous authentication of the CD 1. For example, a representative of a CD—manufacturer can enter stores or shops and then test the CDs using the low-cost hand-held reader.

Variant 2

Figure 10:
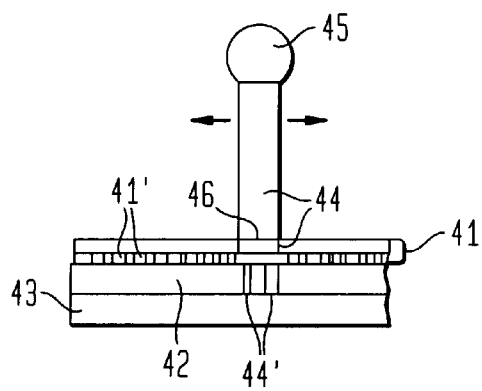
FIG. 10 shows a arrangement for generating rectangular structures.
Figure 11:
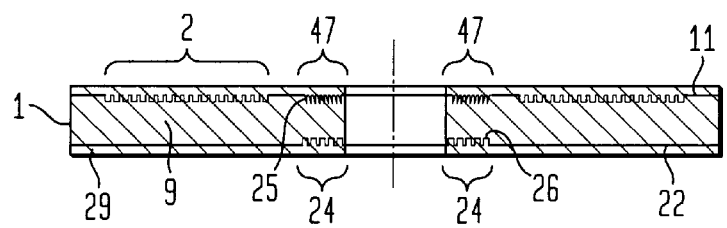
FIG. 11 is a cross section through the improved compact disc with a double layer security device.

The security label 37 as a visible security device is located in the preferred area 6, 7 and/or the outer annulus 41 and is realized by using an electron-beam (e-beam) written chrome mask 4 in FIG. 10 of a grating pattern with resolutions in the sub-micron range; each grating line is written in the mask 41 by the e-beam. By properly exposing the photoresist layer 42 of the CD master substrate 43 through this chrome mask 4 with a single light beam 44 of a light source 45 the photoresist layer 42 on the substrate 43 will be exposed to the light beam 44' passing transparent areas 41' within the grating pattern of the chrome mask 41; it is important to stress that this is not an interference process. After developing, rectangular gratings are realized in the photoresist layer 42 from which the structured first mold 32 (FIG. 6) is formed by a galvanic process. Thus, during the mastering process for the relief structures 25 (FIG. 9), 26 (FIG. 9), the chrome mask 41 is placed in contact with the photoresist layer 42. By moving a spot 46 of the light beam 44 across the grating pattern of the chrome mask 41, areas which are to have the security features 24, 37 are exposed to light. The same process can be used to obtain the master for the mold 3 (FIG. 6) with the data structure 12 (FIG. 2). In a first step, the diffractive structure 31 (FIG. 6) and/or diffractive structures of additional optical features 47 (FIG. 11) are realized. In a second step, the mask 41 is then removed and the data to be stored on the CD 1 (FIG. 3) are then written with the same light beam 44. The molded gratings of the disc body 9 are rectangular and have dimensions in the sub-micron range.

Variant 3

Back to FIG. 9, other than stringent mechanical specifications, few other specifications are given for the preferred area 6, 7 extending from the center hole 3 to the beginning of the information area 2 at the minute spacing ring 5. Because the optical constraints in this area are relaxed with respect to the information area 2, diffractive structures with relatively high diffraction efficiencies can be used. Furthermore, these effects can be optimized for transmission. For example, a Hidden Information Feature for transmission can be built into this area which projects an image onto a screen when the CD 1 is illuminated in transmission.

Variant 4

A Double-Layer Security Device according to U.S. application Ser. No. 09/077,046, mentioned above, is shown in FIG. 11 and is composed of the security feature 24, 37 (FIG. 9) and an optical feature 47 arranged in the preferred area 6, 7 near the center hole 3. At the time of the injection molding, the relief structure 25 of the optical feature 47 and the diffractive feature 24 with the relief structure 26 would be realized the preferred area 6, 7 on both the top surface 11 and the opposite surface 22 of the disc body 9 of the CD 1, respectively. These diffractive features 24, 47 are realized in perfect register with one another. It should then be possible to check for galvanic copies of the CD 1 by checking the register of the two features 24, 47. The relief structure 25 of the diffractive feature 24 is protected by the plastic fill layer 29. A significant distance of several tenths of millimeters separates the top surface 11 and the opposite surface 22 of the disc body 9, yet it is possible to realize visual effects which exploit this separation. In one embodiment of variant 4, the relief structure 25 of the optical feature 47 is a diffracting grating, too. Another embodiment of variant 4 is the realization of a lenticular lens array as the relief structure 25 of the optical feature 47. The diffractive feature 24 is observed though the lenticular lens array. Further embodiments of variant 4 use the security label 37 bonded to the opposite surface. The use of retroreflectors, microlenses, as well as reflowed lenses in combination with an overlay foil 36 having the security feature 24, 37 has potentially interesting visual effects.

Variant 5

In one embodiment of the improved CD 1 a juxtaposition of diffractive fields, e.g. according to EP-A 0 718 834, already mentioned, is used to encode machine-readable information into the CD 1. This information refers to the company of manufacture, year of manufacture, destination (e.g. Asia or North America), identification number etc. As shown in FIG. 3 several diffractive fields 48, 49 are arranged in the identification annulus 7 about the center hole 3 of the CD 1 and form a code. The different diffractive fields 48, 49 distinguish themselves from one another either in profile form of the grating, azimuth (=grating groove direction) or grating period; and perhaps by the spacing between fields 48, 49 or size (in the case shown, of annular sectors) of the fields 48, 49 themselves. Different diffractive structures (e.g. two different diffractive structures S1 and S2) are juxtaposed to represent information; for example, a straightforward binary bar-code encoding, where small fields represent a '0' and large fields represent a '1'. By juxtaposing n fields, $m=2^n$ items can be distinguished. Any number m of CDs 1 can be represented by an appropriate juxtaposition of n fields.

Figure 12:
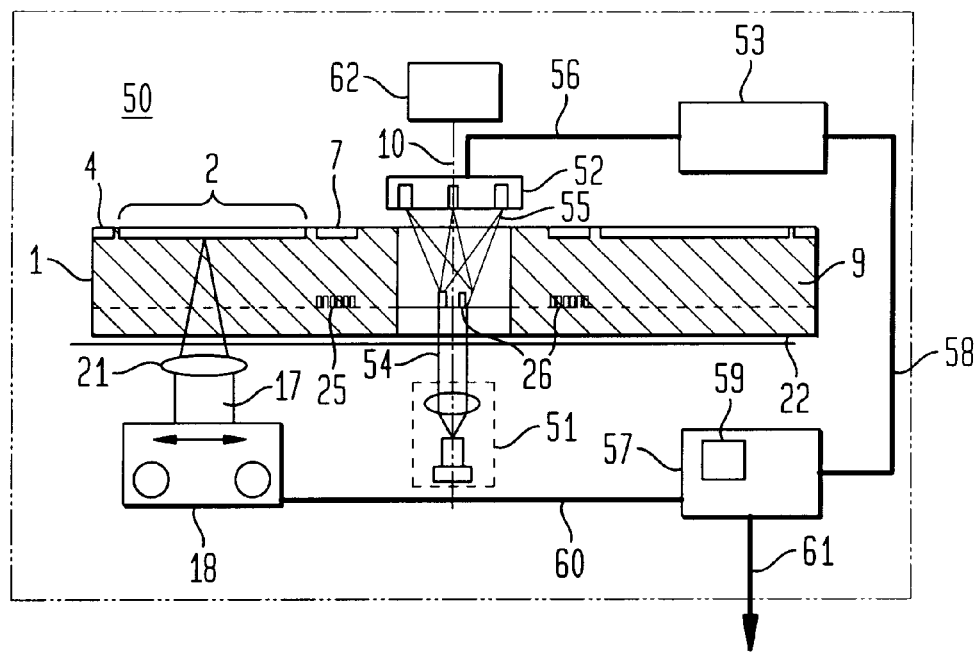
FIG. 12 shows a compact disc reader unit, FIG. 13 another embodiment of a compact disc reader unit.
Figure 13:
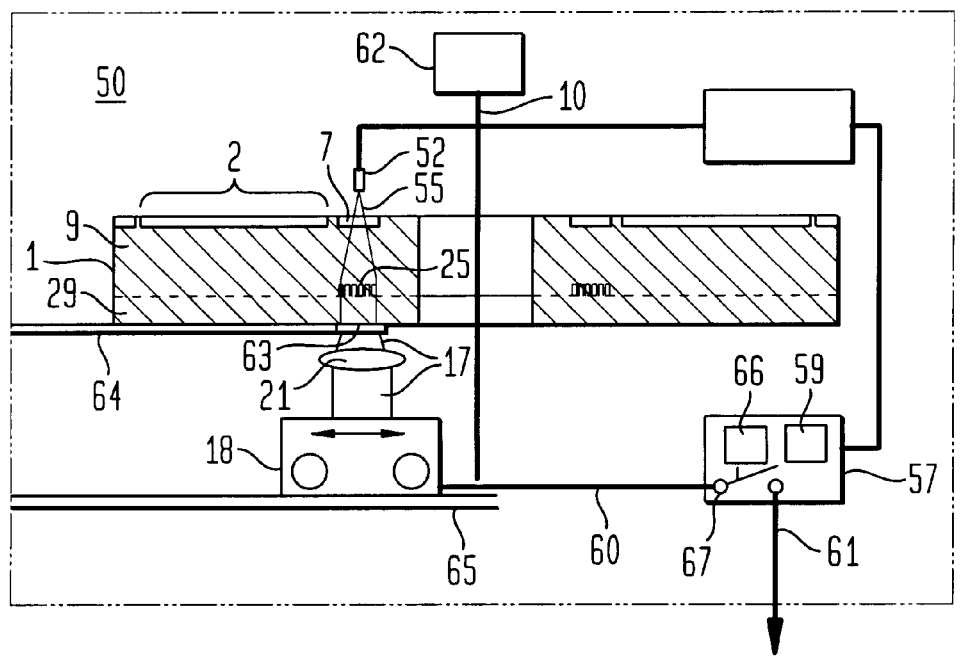

In FIG. 12 a cross section of an embodiment of a CD-reader unit 50 is shown featuring an additional stationary optical reader for reading-out a diffractive code with the fields 48 (FIG. 3), 49 (FIG. 3) located in the identification area 7 and/or in the outer annulus 4 of the improved CD 1. The optical reader comprises at least a light source 51, a detector array 52 and a signal decoder 53. The body 9 of the CD 1 intersects light rays 4 of the light source 51 so that the detector array on the other side of the CD 1 monitors the diffracted light to distinguish the various fields 48, 49. In the drawing of FIG. 12, the optical reader is located behind the axis 10 in order to show diffracted light 55 focused on different detectors of the detector array 52. The light source 51 directs its parallel or focused light rays 54 perpendicularly 3 onto the CD 1 and through e.g. the identification annulus 7 where the code is located. The diffractive structures 25, 26 of the code diffract the light in different directions onto the detector array 52. The variation in time of the diffracted light intensities is recorded by the detector array 52 and transformed into electrical signals. The signals are transferred by means of a line 56 to the signal decoder 53. The signal decoder 53 restitutes the code which in turn is send to an information decoder 57 by a line 58. The information decoder 57 starts the read-out of the information area 2 by the reader head 18 as soon as the code is stored in a memory 59 of the information decoder 57. The reader head 18 focuses its light beam 17 by means of the lens onto the data structure 12 (FIG. 2). Advantageously, the information stored in the information area is scrambled so that without the correct code the information cannot be recognized. The reader head 18 sends read-out scrambled data on a data line 60 to the information decoder 57 where the incoming scrambled data are decoded with a key represented by the code. The decoded data are transferred to an outlet 61. After inserting the CD 1 into the CD-reader 50, a motor 62 starts to turn the CD 1 about the axis 10. As the CD 1 rotates, the detector array 52 measures the diffraction intensities as a function of time; from the time variation of the measured signals, the signal decoder 53 decodes the encrypted data of the code represented by the fields 48, 49.

In the drawing of FIG. 12 the code is designed to be read-out in transmission, in another embodiment the diffractive structures 25, 26 of the code are reflecting to be observed on the same side of the CD 1 where the light rays 4 impinges onto the opposite surface 22 of the CD 1.

Another embodiment of the CD-reader 50 shown in FIG. 3 tests the code stored in the memory 59 if the code is genuine. In case the code is correctly recognized and genuine, an actuator 66 of the information decoder 57 closes a switch 67 to connect the data line 60 directly to the output 61 so that the incoming read-out data are transferred unchanged to the output 61. Advantageously, this embodiment of the CD-reader 50 is used in game consoles, e.g. play stations made by SONY.

In another embodiment of the CD-reader unit 50, the reader head 18 is used to illuminate the code shown as the relief structure 25 at the interface between the disc body 9 and the plastic fill layer 29 in the identification area 7. A special optic 63, e.g. a holographic optical element, arranged on a support 64 incorporated into the light beam 17 of the currently known models of the reader heads 18 changes the focusing power of the lens 21 so that the detector array 52 is able to recognize the code. At the beginning of the reading process, the reader head 18 is moved on a rail 65 in radial direction towards the axis 10 below the special optic 63 and the identification annulus 7. The CD 1 rotates about the axis driven by the motor 62. After recognizing and storing the code in the memory 59 the reading head 18 is moved in radial direction from under the special optic 63 in a data reading position as shown in FIG. 12 so that the light beam 17 is focused onto the data structure (FIG. 2) of the information area 2 in order to start the read-out of the data.

In FIG. 14 an embodiment of the hand-held reader 68 is shown with a viewing screen 69 on its top surface and its transparent bottom facing the improved CD 1. The light source 45, a laser, within the hand-held reader 68 emits coherent light rays 44 and illuminates the improved CD 1 at an oblique angle. The diffractive feature 24 of variant 1, mentioned above, is arranged on the illuminated surface, e.g. the opposite surface 22, of the disc body 9 (FIG. 11) and reconstructs the hidden information in reflection on the screen 69. In the example shown, the reflected light 70 forms the word "GENUINE" as the hidden information on the viewing screen 69. As mentioned above, the Hidden Information Feature cannot be recognized without the coherent light rays 44 or without the viewing screen 69. Alternatively, the diffractive feature 24 with the hidden information is arranged on the reflective top surface 11 (FIG. 11) of the disc body 9. In case the diffractive feature 24 contains an intentionally distorted image, the distorted Fourier hologram, the hand-held reader 68 comprises a special "matched" hologram element 71 for removing the distortion of the Fourier hologram. The holographic element 71 is arranged within the hand-held reader 68 so that the hologram element 71 interacts with the light rays 70 and compensates the distortion thereby projects a clearly visually recognizable image onto the viewing screen 69. Without the intermediate holographic element 71, it is extremely difficult for a possible counterfeiter to reoriginate the distorted hologram, while he has no knowledge of the distortion required.

Another embodiment of the hand-held reader 68 is shown in FIG. 15 and is used for the security features 24 (FIG. 14), 37 (FIG. 3) which are reconstructed in transmission. The CD 1 is inserted into a slot 72 of the hand-held reader 68. The diffractive feature 24 is incorporated into the top or opposite surface 11, 22 in the preferred area 6 (FIG. 3), 7 (FIG. 3) where no reflective layer 14 (FIG. 2) on the top surface 11 hinders light transmission. The improved CD 1 is illuminated by the light source 45 at the oblique angle in the transparent preferred area 6, 7. The light rays 44 penetrate the disc body 9 and interfere with the relief structure 25 of the security features 24, 37. The deflected light 73 reconstructs the visually recognizable image onto the viewing screen 69 for an observer 74 inside the housing of the reader 68. In the case of the distorted image, the holographic element 71 between the improved CD 1 and the viewing screen 69 removes the distortion.

Of course, the hidden information feature can be used without the added element of distortion, thereby eliminating the need for the special intermediate hologram. Although this is not as secure, it is markedly easier to use. This can also allow relaxed illumination requirements; the observer 74 checking the CD 1 needs only to use a laser pointer as light source 45 to illuminate the area of the diffractive feature 24 to see the image projected onto a viewing screen 69, e.g. a piece of paper.

Although illustrative embodiments of the invention have been described in detail with reference to the accompanying drawings, it is to be understood that the invention is not limited to those precise embodiments, especially not to optical data discs of 120 mm diameter, and that various changes and modifications can be effected therein by one skilled in the art without departing from the scope and spirit of the invention as defined by the appended claims.

We claim:

1. A compact disc having a disc body of clear plastic with a center hole, a top surface covered by a lacquer layer, and an opposite surface, wherein said top surface is partitioned into annular areas concentric to said center hole, wherein said annular areas comprise at least an information area with at least optically readable microscopic data structures to store digital information, a preferred area between the center hole and the information area, a reflection layer being arranged between the top surface and the lacquer layer covering at least said information area, wherein a second structured surface arranged parallel to the top surface is defined by a step of a refractive index within the disc body, and wherein diffractive security features, based on sub-micron diffractive relief structures, are formed into the second structured surface.

2. The compact disc according to claim 1 wherein the clear plastic disc body is a laminate comprising at least a data disc made from a first plastic material forming said top surface of the disc body with annular areas and carrying on the opposite surface said sub-micron diffractive relief structures, and a plastic fill layer made from a second plastic material forming the opposite surface of the disc body and covering the opposite surface of the data disc, and that said sub-micron diffractive relief structures are covered and filled in by a lacquer of the second plastic material.

3. The compact disc according to claim 1 wherein the clear plastic disc body is a laminate comprising at least a data disc comprising a first plastic material forming said top surface of the disc body with annular areas and carrying on the opposite surface of the data disc said sub-micron diffractive relief structures, and a molded on plastic fill layer of a second plastic material forming the opposite surface of the disc body and filling in the sub-micron diffractive relief structures, wherein the sub-micron diffractive relief structures are defined by the step of the refractive index at the interface between the first and second plastic material.

4. The compact disc according to claim 1 wherein the clear plastic disc body is a laminate comprising at least a data disc made of a first plastic material forming said top surface of the disc body with annular areas and an overlay plastic foil bonded to at least part of the opposite surface of the data disc, wherein the sub-micron diffractive relief structures of the diffractive security features are embedded between two layers of the overlay plastic foil, and wherein said sub-micron diffractive relief structures are defined by the step of the refractive index at the interface between the first and second layer of the overlay plastic foil.

5. The compact disc according to claim 1 wherein at the step of a refractive index at the interface defining said sub-micron diffractive relief structures exceeds 0.1 at least in a spectral region $\Gamma$.

6. The compact disc according to claim 1 wherein the step of the refractive index, a refractive index difference $D_n$ at the interface defining the sub-micron diffractive relief structures exceeds 0.1 at least in a spectral region $\Gamma$, and wherein the first and second plastic materials are based on a same polymer and the refractive index difference $D_n$ of at least one of the plastic material is modified to change its refractive index by adding a dye.

7. The compact disc according to claim 1 wherein the step of a refractive index, a refractive index difference $D_n$ at the interface defining the sub-micron diffractive relief structures is $0.1<|D_n|<0.2$ for a spectral region $\Gamma$ and $|D_n|<0.1$ elsewhere.

8. The compact disc according to claim 1 wherein the step of a refractive index a refractive index difference $D_n$ at the interface defining the sub-micron diffractive relief structures is $0.1<|D_n|<0.2$ for a spectral region $\Gamma$ and $|D_n|<0.1$ elsewhere, and wherein the first and second plastic materials are based on the same polymer and the refractive index difference $D_n$ of at least one of the plastic materials is modified to change its refractive index by adding a dye.

9. The compact disc according to claim 1 wherein the diffractive security feature is arranged in the identification annulus of the preferred area about the center hole on the opposite surface of the data disc, wherein said sub-micron diffractive relief structures of the diffractive security features are defined by a reflector between the first and second plastic material.

10. The compact disc according to claim 1 wherein the security features is arranged in the preferred area of the identification annulus about the center hole and comprises at least a hidden information structure, said hidden information structure being a kinoform.

11. The compact disc according to claim 1 wherein the security feature is arranged in the preferred area of the identification annulus about the center hole and comprises at least a hidden information structure, said hidden information structure being a distorted Fourier hologram.

12. The compact disc according to claim 1 wherein the security feature is arranged in the preferred area of the identification annulus about the center hole and incorporates several diffractive fields forming a machine readable optical code.

13. The compact disc according to claim 1 wherein said sub-micron diffractive relief structures of the security features have rectangular diffractive gratings with dimensions in the sub-micron range.

14. The compact disc according to claim 1 wherein at least one of said security features is arranged in said preferred area about the center hole on the opposite surface of the data disc, and wherein at least an additional optical feature is formed in said preferred area about the center hole on the top surface of the data disc in register to the security feature.

15. The compact disc according to claim 1 wherein at least a security feature is arranged in the preferred area about the center hole on the opposite surface of the data disc and that at least an additional optical feature is formed in the preferred area about the center hole on the top surface of the data disc in register to the security feature and wherein a reflector enhances the diffraction efficiency of at least one of said security features and the additional optical features of said top surface, wherein $D_n$ indicates a refractive index difference at the interface defining the sub-micron relief structures of the security features and of the additional optical features, and wherein the refractive index differences $D_n$ of the reflectors are $|D_n|>0.1$ for a spectral region $\Gamma$ and $|D_n|<0.1$ elsewhere.

16. A compact disc reader having:
a reader head for emitting a light beam that is focused onto data structures of an information area of a compact disc and for receiving reflected light from said data structures, wherein the reader head moves in radial direction to read-out data of said information area,
a motor for rotating said compact disc about its axis,
a light source for generating light rays for illuminating security features outside the information area of the rotating compact disc,
a detector array for receiving light diffracted by the security features, in different directions,
a signal decoder which receives and decodes signals from said detector array for recognizing a code of the security feature, and
an information decoder for receiving, on a data line, data signals sent by said reader head, for storing the code from said signal decoder in a memory, and for transferring the incoming data signals from the data line to an outlet.

17. The compact disc reader of claim 16 wherein the read-out data from the reader head are encoded, and wherein said information decoder decodes, using said code in the memory as a key, the read-out data prior to the transfer of the data to the outlet.

18. The compact disc reader of claim 16 wherein the information decoder tests said code for its genuiness, and comprises a switch which connects the data line to the outlet allowing a transfer of the data to the outlet only when said code is genuine.

19. The compact disc reader of claim 18 wherein said light source is the reader head when moved into a correct position outside the information area, and wherein a special optic is arranged in said position between the reader head and the compact disc in order to change the focusing of the light beam of the reader head into the appropriately focused light rays for illuminating diffractive security features.

20. The compact disc according to claim 1 wherein a transparent dielectric reflector covering said sub-micron diffractive relief structures, is embedded between the plastic materials at said interface to enhance the step of the refractive index.

21. The compact disc according to claim 1 wherein a metallic reflector covering said sub-micron diffractive relief structures, is embedded between the plastic materials at said interface to enhance the step of the refractive index.

22. A compact disc having a disc body of clear plastic with a center hole, a top surface covered by a lacquer layer, and an opposite surface, wherein the top surface is partitioned into annular areas concentric to the center hole, wherein the annular areas comprise at least an information area with at least optically readable microscopic data structures to store digital information, and a preferred area between the center hole and the information area, a reflection layer being arranged between the top surface and the lacquer layer covering at least the least the information area, wherein diffractive security features based on sub-micron diffractive relief structures are formed on the opposite surface of the disc body in an identification annulus of the preferred area about the center hole.

23. The compact disc according to claim 22 wherein the security feature is arranged in the preferred area of the identification annulus about the center hole and comprises at least a hidden information structure, said hidden information structure being a kinoform.

24. The compact disc according to claim 22 wherein the security feature is arranged in the preferred area of the identification annulus about the center hole and comprises at least a hidden information structure, said hidden information structure being a distorted Fourier hologram.

25. The compact disc according to claim 22 wherein the security feature is arranged in the preferred area of the identification annulus about the center hole and incorporates several diffractive fields forming a machine readable optical code.

26. The compact disc according to claim 22 wherein said sub-micron diffractive relief structures of the security features have rectangular diffractive gratings with dimensions in the sub-micron range.

* * * * *